United States Patent [19]
von der Heide

[11] 4,220,899
[45] Sep. 2, 1980

[54] POLYPHASE LINEAR MOTOR

[75] Inventor: Johann von der Heide, Mönchweiler, Fed. Rep. of Germany

[73] Assignee: Papst-Motoren KG, St. Georgen, Fed. Rep. of Germany

[21] Appl. No.: 942,288

[22] Filed: Sep. 14, 1978

[30] Foreign Application Priority Data

Sep. 19, 1977 [DE] Fed. Rep. of Germany ....... 2742050

[51] Int. Cl.² .............................................. H02K 41/02
[52] U.S. Cl. ...................... 318/135; 310/12; 310/14; 104/290
[58] Field of Search ..................... 310/12–14; 104/148 LM; 318/135

[56] References Cited

U.S. PATENT DOCUMENTS

| | | | |
|---|---|---|---|
| 1,020,942 | 3/1912 | Bachelet | 310/14 |
| 1,020,943 | 3/1912 | Bachelet | 310/13 |
| 2,112,264 | 3/1938 | Bowles et al. | 310/13 |
| 3,575,650 | 4/1971 | Fengler | 310/12 X |
| 3,594,622 | 7/1971 | Inagaki | 318/135 |
| 3,706,922 | 12/1972 | Inagaki | 318/135 |
| 3,707,924 | 1/1973 | Barthalon et al. | 104/148 LM |
| 3,884,154 | 5/1975 | Marten | 310/12 X |
| 4,151,447 | 4/1979 | von der Heide et al. | 318/135 |

Primary Examiner—Donovan F. Duggan
Attorney, Agent, or Firm—Michael J. Striker

[57] ABSTRACT

The linear motor comprises a stator and an armature mounted for travel along the length of the stator. The stator includes an elongated inner flux-carrying structure extending in the direction of armature travel. A plurality of stationary coils are provided on the inner flux-carrying structure, the stationary coils being spaced in the direction of armature travel. The armature is provided with a plurality of radially magnetized permanent magnet units spaced in the direction of armature travel. The magnetic polarity of successive ones of the permanent magnet units alternates, proceeding in the direction of armature travel from one permanent magnet unit to the next. An outer flux-carrying structure, provided on either the stator or armature, extends in the direction of armature travel and surrounds the armature. Because the polarity of successive permanent magnet units alternates, proceeding from one to the next, the flux passing through the inner and outer flux-carrying structures is not, at any point, equal to the sum of the fluxes from all the permanent magnets, and accordingly the flux-carrying structures can be of smaller flux-conducting cross-sectional areas, and therefore of lower weight.

22 Claims, 3 Drawing Figures

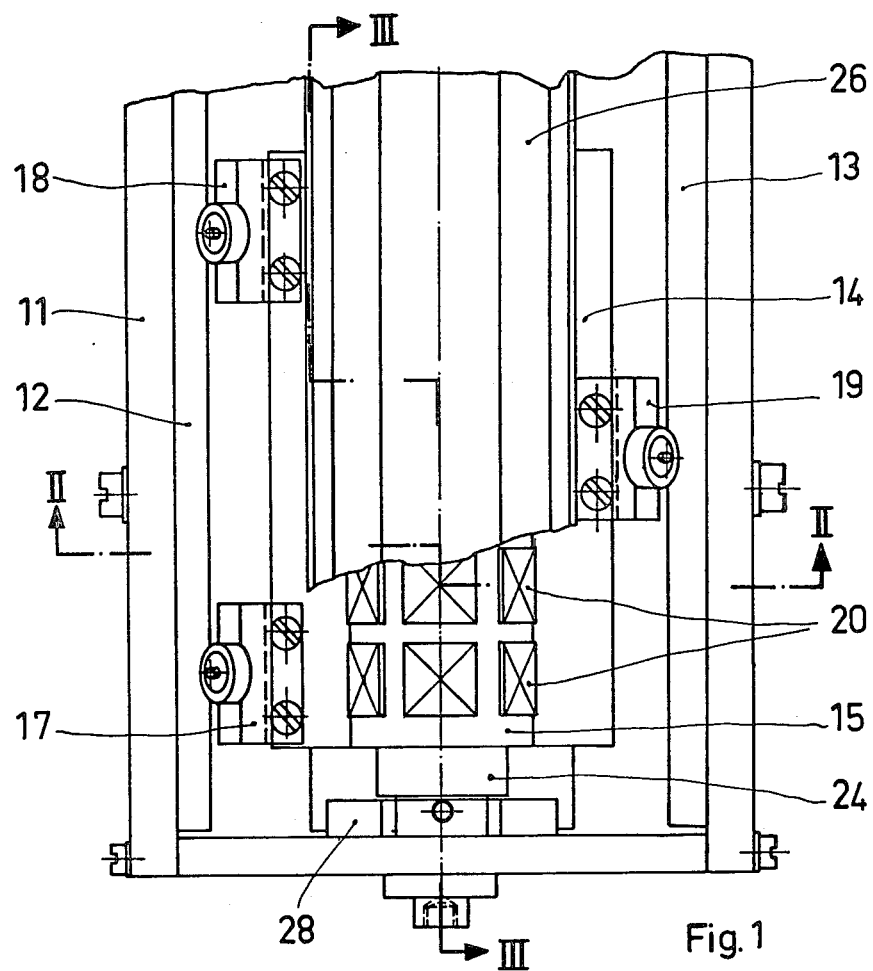
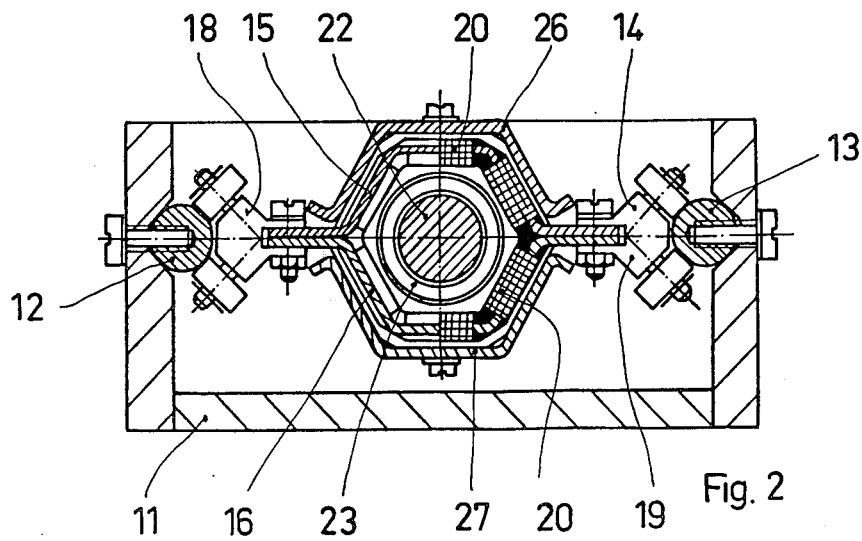

POLYPHASE LINEAR MOTOR

BACKGROUND OF THE INVENTION

The present invention concerns polyphase linear motors of the type whose armature field is established by permanent armature magnets, with the energized coils of the motor being stationary. This type of linear motor finds frequent use in the data-processing field, where it is used to drive peripheral equipment, e.g., to advance printing heads on print-out machines, or the like.

Published German patent application DE-OS 26 54 075 and corresponding U.S. patent application Ser. No. 855,282 filed Nov. 28, 1977 disclose a linear motor comprising two parallel ferromagnetic rails provided with a magnet system. The motor comprises an armature carrying a plurality of energized coils which travel along the length of the rails, intersecting the magnetic-field lines of the magnet system. At least one of the rails is provided, on the side thereof facing the other of the rails, with a row of permanent magnets. The magnetization direction of these magnets is perpendicular to the direction of armature travel, and the magnetic polarity of successive ones of the permanent magnets in the row alternates. The coil system of the motor includes at least two coils. The coils are located intermediate the row of permanent magnets and the second of the two rails, or between the two rows of permanent magnets in the event each of the two rails is provided with such a row of permanent magnets. The coils are spaced from each other in the direction of armature travel.

That prior-art motor exhibits more complete utilization of the current flowing through the coils for actual motive-force generation, i.e., so that greater sectors of the coil conductors, or more precisely the current flowing through them, actually cooperate with magnetic flux to yield motive force, compared to prior art.

SUMMARY OF THE INVENTION

It is a main object of the present invention to even further increase the efficiency of linear motors, i.e., relative to what can be achieved with the prior-art design referred to above. Thus, it is an object to still further minimize the fraction of coil conductors (or more precisely the current flowing through them) not actually participating in motive-force generation. Also, it is an object to be able to keep as low as possible the amount of iron needed for the flux-carrying magnetic circuit of the motor.

In accordance with the present invention, this is achieved as follows. The coil system of the motor comprises at least two coils which are spaced from one another in the direction of armature travel, and the coils are stationary. Preferably, the coils are mounted on an inner flux-carrying structure of the motor's magnetic circuit. The armature of the motor has an armature field established by permanent magnets. The permanent-magnet structure on the armature coaxially surrounds the coil system. The armature's permanent-magnet structure is, in turn, surrounded by a coaxial outer flux-carrying structure. The intercoil pitch of the stator coils and the intermagnet pitch of the armature magnets, measured in the direction of armature travel, are so related to each other as to yield a motive force shifting the armature longitudinally when the coils of the coil system are cyclically and sequentially energized.

With this construction, virtually the entirety of all conductors in the coils of the coil system actually participate in motive-force generation such as to advance the armature. The electrical losses normally attributable to the flow of current in coil sectors not actually helping to develop motive force, is kept particularly small. The weight of iron needed for the magnetic circuit of the motor can be kept quite low, because the flux-carrying magnetic circuit of the motor does not exhibit the usual tendency to go into magnetic saturation.

Now, Federal Republic of Germany published patent application DE-OS 25 42 299 discloses a linear motor comprising a stator core; an induction coil which encircles the core and is subdivided into a plurality of component coils which can be individually switched on and off; an outer flux-return structure; and on the armature of the motor, intermediate the outer flux-return structure and the induction coil, a permanent magnet which travels with the armature. However, the direction of the flux passing through the armature's permanent magnet and through the induction coil, at the region of motive-force generation, is always the same. In contrast, in the present invention, the direction of the flux passing through the permanent armature magnets and the coils of the coil system alternates along the length of the armature travel path. As a result, the flux associated with the individual armature magnets does not add up cumulatively when the flux of successive neighboring armature magnets is added on in the process of ascertaining the total flux through the flux-return structure of the motor's magnetic circuit. Accordingly, with the inventive construction, the flux-return structure of the magnetic circuit is not called upon to carry a return flux equal to the sum of the flux coming from all the armature magnets jointly. This makes it possible for the cross-sectional area of the flux-return structure to be considerably smaller than in such prior art. For a given cross-sectional area of the flux-return structure, use can be made of very high quality permanent magnets affording higher useful fluxes. Accordingly, if the dimensions of the motor, and particularly the cross-sectional area of its flux-return structure, are given, greater motor power can be achieved; conversely, if the power which the motor is to develop is a given, the motor can be of smaller dimensions than with the prior-art construction.

Preferably, the permanent magnets on the armature are radially magnetized magnetic plates disposed in a polygonal, and preferably hexagonal, arrangement. This makes it possible to rather freely select magnets having the most desirable magnetic properties, especially samarium-colbalt magnets which are commercially available in only a small variety of shapes.

The outer flux-carrying structure of the motor's magnetic circuit can be provided either on the stator or on the armature of the motor. In the first case, this reduces the mass of moving material on the armature; in the latter case, reduced eddy-current and hysteresis losses are achieved.

Instead of providing the armature with individual magnetized plates, one could employ magnets which are already of annular or polygonal configuration.

The coil system of the inventive linear motor preferably comprises an axial succession of single annular coils made of wound copper strip material, with insulating foil or other insulating components being provided intermediate adjoining ones of the wound copper strip coils. Preferably, the insulating components extend both radially inwardly and outwardly a small distance beyond the individual coils. Wound copper strip coils are very easily and neatly fabricated. Furthermore short-circuits at the edges of the wound copper strip coils are reliably avoided.

Preferably, the plural coils are so interconnected as to form a three-strand coil configuration. In practice this configuration has provided to be the one requiring the least cost for the control electronics which are to control coil energization. Also, this configuration makes for very efficient utilization of the fields emanating from the permanent magnets, especially when ferrite- and samarium-cobalt magnets are employed.

Preferably, the armature carrying the permanent magnets is an injection-molded item, preferably made of glass-fiber-reinforced plastic or light-metal, and the permanent magnets are molded in place, i.e., positioned in the mold used to form the armature with the armature molded in place around them.

In the preferred embodiment of the invention, sleeves of material having a high electrical conductivity are pushed onto the ends of the inner flux-carrying structure of the motor's magnetic circuit. If the armature travels beyond the limit of its intended range of motion, i.e., so that the motor's magnetic field begins to penetrate one of these two highly conductive sleeves, the motor's magnetic energy is quickly converted into thermal energy and dissipated, as a result of sizable eddy-current generation in such sleeve. This brakes the travel of the armature before, for example, the armature can impact at full speed against an end of the stationary part of the linear motor. Advantageously, the ends of the motor are additionally constituted by impact-absorbing material or are provided with shock-absorbing structure, to absorb the kinetic energy of the armature if it does impact against an end of the motor.

The inner flux-carrying structure of the motor can be hollow and then accommodate heat-dissipating means for dissipating heat generated within the motor. The heat-dissipating means can take the form of a cold-water cooling system, a forced-air cooling system, or can comprise a heat pipe.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a partly broken-away top view looking down upon a preferred embodiment of the inventive linear motor;

FIG. 2 is a transverse section taken along line II—II of FIG. 1; and

DESCRIPTION OF THE PREFERRED EMBODIMENTS

Figure 3:
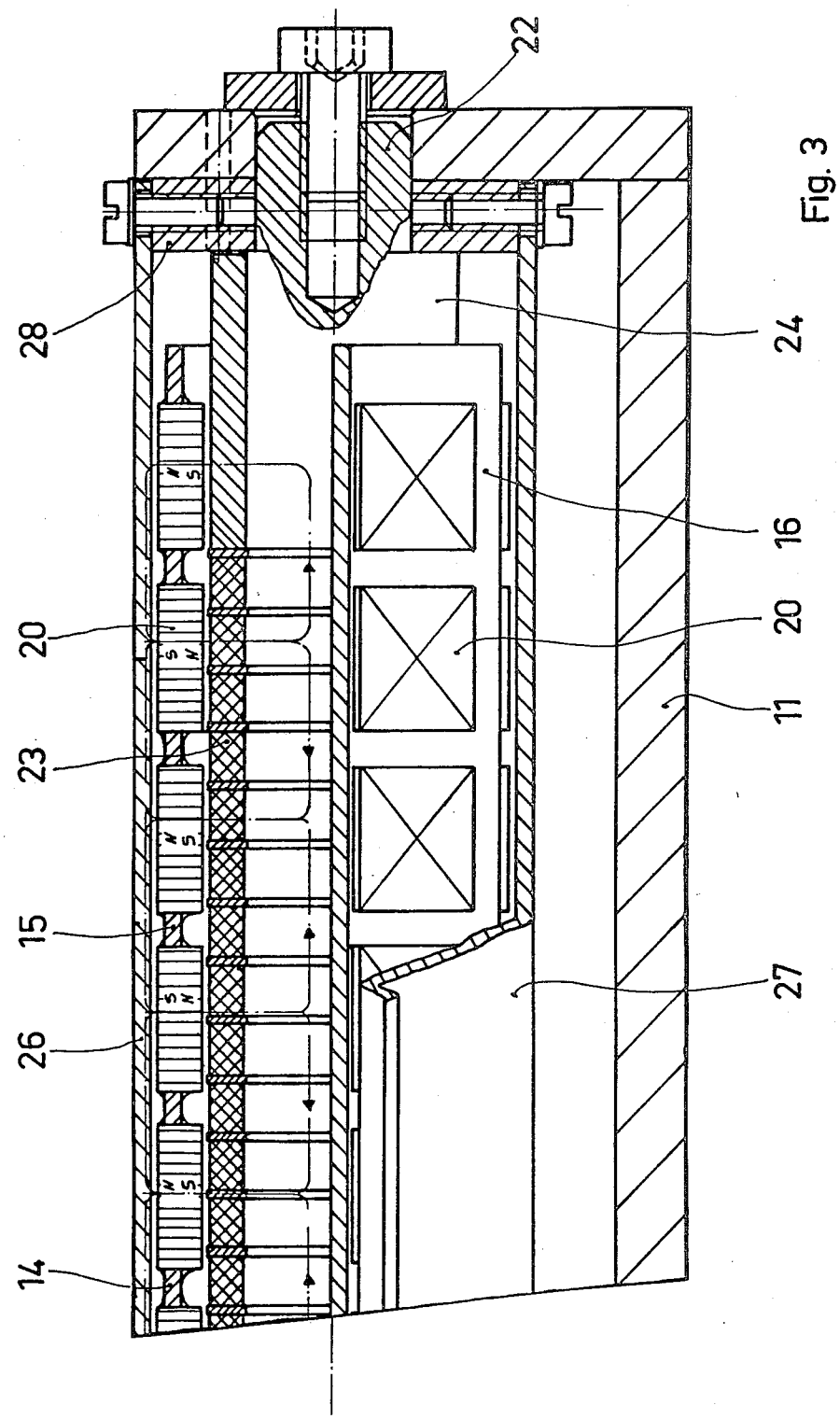
FIG. 3 is a larger-scale longitudinal section taken along line III—III of FIG. 1.

FIGS. 1-3 are respectively a top view, a transverse section and a longitudinal section through a preferred embodiment of the inventive linear motor.

The motor comprises a carrier 11 of U-shaped transverse cross-sectional configuration. The upright side walls of carrier 11, at their inward faces, mount two armature rails 12, 13 defining the travel path of the motor's armature, the latter here denoted in toto by reference numeral 14. The armature 14 comprises two non-ferromagnetic half-polygonal shells 15, 16 which when assembled as shown have a polygonal cross-sectional configuration. The two half shells 15, 16 are connected together by means of the illustrated bolts and nuts, which also secure to them three roller sets 17, 18, 19. Each roller set comprises an upper roller riding along an upper surface of the respective rail 12 or 13, and a lower roller riding along the lower surface of the respective rail. The two rollers sets 17, 18 ride on rail 12, whereas roller set 19 rides on rail 13.

The hexagonal structure formed by the two half shells 15, 16 is provided with a plurality of magnetized plates 20. The magnetized plates 20 are disposed in groups of six each, a succession of such groups extending along the length of the armature. Within each group of six plates 20, the plates are identically spaced from and oriented with respect to the central longitudinal axis of the armature. Within each group of six plates 20, all of the magnets have the same radial polarization direction, but the polarization directions of adjoining groups-of-six are opposite to each other. Here, the half shells 15, 16 are injection-molded items and are formed with the magnetic plates 20 properly positioned in the mold used to form the shells 15, 16, i.e., so that the plates 20 be molded in place. This makes it possible to use commercially available magnetic plates 20 of standard sizes and dimensions. Alternatively, however, each group of six plates 20 could be replaced by a single annular magnetic structure, for example likewise of hexagonal cross-section and radially magnetized.

Connected to the carrier 11 is an inner ferromagnetic flux-carrying structure 22. Mounted on inner flux-carrying structure 22 is an axial succession of individual annular coils 23 (thirteen of them visible in FIG. 3). Each coil 23 is wound f.i. from flat copper strip material, and the individual coils are electrically interconnected in three-strand configuration. At each of the two ends of the motor, a respective sleeve 24 of highly electrically conductive material is slipped over the inner flux-carrying structure 22. If the armature travels beyond the coils 23 towards one or the other end of the motor, the motor's magnetic field permeates one of these sleeves 24, and the magnetic energy of the motor is dissipated by eddy-current generation, thereby braking the armature. The axial succession of coils 23 is coaxially surrounded by the armature 14. The armature 14 in turn is coaxially surrounded by two ferromagnetic half shells 26, 27 which together form an outer flux-carrying structure of hexagonal cross-sectional configuration. The hexagonal outer flux-carrying structure 26, 27 is stationary, and is secured at its two ends to two mounting elements 28 provided at the two ends of the motor. The mounting elements 28 can be made of shock-absorbing material or provided with shock-absorbing means, to absorb the shock of the armature 14 in the event the latter travels so far along the rails 12, 13 as to impact against one or the other end of the motor. Each mounting element 28 is likewise hexagonal.

To effect armature travel, the coils 23 are energized in cyclical succession. This can be accomplished using polyphase current. Preferably, however, use is made of a (non-illustrated) commutating system which energizes the coils 23 in cyclical succession in dependence upon the location of the armature intermediate the ends of the motor. For example, published Federal Republic of Germany patent application DE-OS 2,654,075 and corresponding U.S. patent application Ser. No. 855,282 filed Nov. 28, 1977 disclose a commutation system in which a coded strip extends along the length of the travel path of a linear-motor armature, and optoelectronic sensors on the armature sense coded markings on the strip, thereby generating control signals for commutating the coil-energization current.

The illustrated linear motor can be used as the servo motor of a negative-feedback system. The coils 23 can be connected to the power amplifier stage of a negative-feedback positioning system, for use of the motor as a positioning servo motor, or even to impart to the motor the operating characteristics of a stepper motor. Such a technique is disclosed for example in U.S. Pat. No. 4,042,863. The position feedback signal of the system, in that event, is preferably generated, once again, by using optoelectronic means to sense code markings on a code strip extending along the length of the armature travel path. Such a code strip would preferably be provided at a location on carrier 11 relatively free from the threat of dust accumulation, for example near the base of the U-shaped carrier 11.

If dust accumulation poses a problem for the motor, e.g., when it is used to drive the printing head of a print-out machine, the motor can be provided with a dust-protection system such as disclosed in German published patent application DE-OS 2,654,075 already referred to.

As shown best in FIG. 3, the individual coils 23 are spaced from one another by intermediate annular insulating elements which extend radially inward and radially outward somewhat beyond the coils 23; these insulating elements are preferably made of insulating foil material.

In the drawing, the inner flux-carrying structure 22 is a solid bar of ferromagnetic material. Alternatively, it can be hollow and accommodate heat-dissipating means, e.g., a heat pipe, or serve as a channel for forced cooling air or forced cooling water.

It will be understood that each of the elements described above, or two or more together, may also find a useful application in other types of constructions differing from the types described above.

While the invention has been illustrated and described as embodied in a linear motor of particular design, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A polyphase linear motor, particularly for use as a drive motor for peripheral equipment in data-processing installations or the like, the motor comprising a stator and an armature mounted for travel along the length of the stator, the stator including an elongated inner flux-carrying structure extending in the direction of armature travel; a plurality of stationary coils on the inner flux-carrying structure, the stationary coils being spaced in the direction of armature travel; a plurality of permanent magnet units on the armature, the permanent magnet units being spaced in the direction of armature travel, each permanent magnet unit surrounding the inner flux-carrying structure and the coils on the latter, the magnetic polarity of successive ones of the permanent magnet units alternating proceeding in the direction of armature travel from one permanent magnet unit to the next; and an outer flux-carrying structure extending in the direction of armature travel and surrounding the armature.

2. The linear motor defined in claim 1, wherein each permanent magnet unit is of polygonal configuration, is coaxial with the longitudinal axis of the elongated inner flux-carrying structure, and is radially magnetized.

3. The linear motor defined in claim 2, each permanent magnet unit comprising a plurality of magnetic plates arranged to form a polygon.

4. The linear motor defined in claim 2, the polygonal configuration being hexagonal.

5. The linear motor defined in claim 2, the cross-sectional configuration of both the inner and outer flux-carrying structures being polygonal and matching that of the permanent magnet units.

6. The linear motor defined in claim 1, the outer flux-carrying structure being a stationary structure.

7. The linear motor defined in claim 1, the outer flux-carrying structure being coupled to and travelling with the armature.

8. The linear motor defined in claim 1, each permanent magnet unit comprising a single radially magnetized permanent magnet of circular configuration.

9. The linear motor defined in claim 1, each permanent magnet unit comprising a single radially magnetized permanent magnet of polygonal configuration.

10. The linear motor defined in claim 1, the plurality of stationary coils on the inner flux-carrying structure comprising a succession of more than two such coils, the succession of coils extending in the direction of armature travel, each coil being a single annular coil.

11. The linear motor defined in claim 10, each annular coil being a wound strip of flat copper material.

12. The linear motor defined in claim 11, furthermore including insulating elements located intermediate adjoining ones of the coils.

13. The linear motor defined in claim 12, the insulating elements extending radially inward slightly beyond the coils and radially outward slightly beyond the coils.

14. The linear motor defined in claim 10, the coils being electrically interconnected in three-strand configuration.

15. The linear motor defined in claim 1, the armature comprising an injection-molded item, the permanent magnet units being secured thereto.

16. The linear motor defined in claim 15, the permanent magnet units being held in place on the injection-molded item by virtue of the injection-molded item being molded around them.

17. The linear motor defined in claim 1, furthermore including two sleeves of material of high electrical conductivity, each surrounding the inner flux-carrying structure at a respective one of the two ends of the linear motor, whereby if the armature travels so far towards one or the other end of the motor that the motor flux passes through the respective highly conductive sleeve eddy current generation results in braking of the armature.

18. The linear motor defined in claim 1, furthermore including impact-absorbing structures located at the two ends of the linear motor for cushioning the impact of the armature in the event the armature travels so far as to impact against an end of the motor.

19. The linear motor defined in claim 1, the inner flux-carrying structure being hollow and provided with heat dissipating means.

20. The linear motor defined in claim 1, furthermore including commutating means connected to the coils and operative for controlling their energization in dependence upon the position of the travelling armature.

21. The linear motor defined in claim 20, the commutating means including optoelectronic means for detecting the position of the travelling armature.

22. The linear motor defined in claim 1, furthermore including means connected to and controlling the energization of the stationary coils and causing the linear motor to perform as the servo motor of a negative-feedback system.

* * * * *